(12) United States Patent
Bivins et al.

(10) Patent No.: US 11,216,770 B2
(45) Date of Patent: Jan. 4, 2022

(54) OPTIMIZING SERVICE REQUESTS IN TRANSPORT SUPPLY-CONSTRAINED SUB-REGIONS

(71) Applicant: Uber Technologies, Inc., San Francisco, CA (US)

(72) Inventors: David Bivins, San Francisco, CA (US); Jason Wien, San Francisco, CA (US); Daniel Wang, San Francisco, CA (US); Benjamin Morris Dreier, San Francisco, CA (US); Pierce Cunneen, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/570,631

(22) Filed: Sep. 13, 2019

(65) Prior Publication Data
US 2021/0081880 A1    Mar. 18, 2021

(51) Int. Cl.
*G06Q 10/08* (2012.01)

(52) U.S. Cl.
CPC ......... *G06Q 10/083* (2013.01); *G06Q 10/087* (2013.01)

(58) Field of Classification Search
CPC .................. G06Q 10/083; G06Q 10/087
See application file for complete search history.

(56) References Cited

U.S. PATENT DOCUMENTS

| | | |
|---|---|---|
| 6,862,572 B1 | 3/2005 | de Sylva |
| 8,315,802 B2 | 11/2012 | Brown |
| 9,754,331 B1 | 9/2017 | Beckelman |

(Continued)

FOREIGN PATENT DOCUMENTS

| | | |
|---|---|---|
| CN | 104751272 | 7/2015 |
| KR | 10-2014-0101501 | 8/2014 |

(Continued)

OTHER PUBLICATIONS

Mabe, John, The 'Uber-for-X Model' and the Complexity of on-Demand Delivery, Techgistics, Dec. 1, 2016.

(Continued)

*Primary Examiner* — Vanel Frenel
(74) *Attorney, Agent, or Firm* — Merchant & Gould P.C.

(57) ABSTRACT

A system can implement a delivery service for a service region by monitoring, for each respective sub-region of the service region, supply conditions corresponding to transport providers available to deliver menu items from menu item suppliers to requesting users. When the supply conditions have dropped below the equilibrium threshold for a respective sub-region, the system can initiate a supply-constrained mode for the respective sub-region in which the system inputs each respective menu item request received, corresponding to a delivery location within the respective sub-region, into a queue, and dynamically determines a fulfillment probability for the respective menu item request. When the fulfillment probability of the respective menu item request exceeds a fulfillment threshold, the system can transmit the respective menu item request to a corresponding menu item supplier for preparation of a corresponding menu item and coordinate delivery of the corresponding menu item to the requesting user.

20 Claims, 6 Drawing Sheets

(56) References Cited

U.S. PATENT DOCUMENTS

| | | | |
|---|---|---|---|
| 9,993,735 B2 | 6/2018 | Aghdaie | |
| 10,026,055 B2 | 7/2018 | Riel-Dalpe | |
| 10,029,787 B1 | 7/2018 | Lesser | |
| 10,133,995 B1 | 11/2018 | Reiss | |
| 10,156,449 B2 | 12/2018 | Colijin | |
| 10,308,430 B1 | 6/2019 | Brady | |
| 10,360,616 B2 | 7/2019 | Lopez | |
| 10,366,434 B1 | 7/2019 | Belousova | |
| 10,445,672 B2* | 10/2019 | Renfroe | G06Q 50/12 |
| 10,467,562 B1 | 11/2019 | Mo | |
| 10,467,563 B1 | 11/2019 | Mo | |
| 10,586,273 B1 | 3/2020 | Kohli | |
| 2001/0047285 A1 | 11/2001 | Borders | |
| 2002/0152128 A1 | 10/2002 | Walch | |
| 2002/0188492 A1 | 12/2002 | Borton | |
| 2004/0030572 A1 | 2/2004 | Campbell | |
| 2004/0210621 A1 | 10/2004 | Antonellis | |
| 2004/0260470 A1 | 12/2004 | Rast | |
| 2005/0209913 A1 | 9/2005 | Wied | |
| 2007/0033087 A1 | 2/2007 | Combs | |
| 2008/0046326 A1 | 2/2008 | Horstemeyer | |
| 2008/0195428 A1 | 8/2008 | O'Sullivan | |
| 2009/0048890 A1 | 2/2009 | Burgh | |
| 2010/0153279 A1 | 6/2010 | Zahn | |
| 2011/0258134 A1 | 10/2011 | Mendez | |
| 2011/0307282 A1* | 12/2011 | Camp | G06Q 10/025 705/7.11 |
| 2012/0203619 A1 | 8/2012 | Lutnick | |
| 2012/0253878 A1 | 10/2012 | Forstall | |
| 2013/0218727 A1 | 8/2013 | Lutnick | |
| 2014/0011522 A1 | 1/2014 | Lin | |
| 2014/0026054 A1 | 1/2014 | Wang | |
| 2014/0058902 A1 | 2/2014 | Taylor | |
| 2014/0108201 A1 | 4/2014 | Franchette | |
| 2014/0164126 A1 | 6/2014 | Nicholas | |
| 2014/0172739 A1 | 6/2014 | Anderson | |
| 2014/0188750 A1 | 7/2014 | Seiler | |
| 2014/0214465 A1 | 7/2014 | L'Heureaux | |
| 2014/0229099 A1 | 8/2014 | Garrett | |
| 2014/0278635 A1 | 9/2014 | Fulton | |
| 2014/0370167 A1 | 12/2014 | Garden | |
| 2015/0142640 A1 | 5/2015 | Kneen | |
| 2015/0154538 A1 | 6/2015 | Skaaksrud | |
| 2015/0204684 A1 | 7/2015 | Rostamian | |
| 2015/0223024 A1 | 8/2015 | Abuodeh | |
| 2015/0227980 A1 | 8/2015 | Eberhardt | |
| 2015/0248689 A1 | 9/2015 | Paul | |
| 2015/0262121 A1 | 9/2015 | Riel-Dalpe | |
| 2015/0310379 A1 | 10/2015 | Farrelly | |
| 2015/0347964 A1 | 12/2015 | Taylor | |
| 2015/0363843 A1 | 12/2015 | Loppatto | |
| 2016/0012391 A1 | 1/2016 | Burnett | |
| 2016/0019496 A1 | 1/2016 | Gorlin | |
| 2016/0027079 A1 | 1/2016 | Schoeffler | |
| 2016/0034845 A1 | 2/2016 | Hiyama | |
| 2016/0035248 A1 | 2/2016 | Gibbs | |
| 2016/0042303 A1 | 2/2016 | Medina | |
| 2016/0078516 A1 | 3/2016 | Alnuwaysir | |
| 2016/0104112 A1 | 4/2016 | Gorlin | |
| 2016/0104113 A1 | 4/2016 | Gorlin | |
| 2016/0132792 A1 | 5/2016 | Rosnow | |
| 2016/0140589 A1 | 5/2016 | Deshpande | |
| 2016/0148306 A1 | 5/2016 | Bellavance | |
| 2016/0171439 A1 | 6/2016 | Ladden | |
| 2016/0171542 A1 | 6/2016 | Fanous | |
| 2016/0171584 A1 | 6/2016 | Cao | |
| 2016/0210591 A1 | 7/2016 | Lafrance | |
| 2016/0328669 A1 | 11/2016 | Droege | |
| 2016/0353235 A1 | 12/2016 | Williams | |
| 2017/0024789 A1 | 1/2017 | Frehn | |
| 2017/0093803 A1 | 3/2017 | Nayshtut | |
| 2017/0116566 A1* | 4/2017 | Walton | G06Q 10/04 |
| 2017/0270794 A1 | 9/2017 | Sweeney | |
| 2017/0290345 A1 | 10/2017 | Garden | |
| 2018/0025298 A1 | 1/2018 | Baggott | |
| 2018/0067620 A1 | 3/2018 | Adler | |
| 2018/0089621 A1 | 3/2018 | Perez Barrara | |
| 2018/0253805 A1 | 5/2018 | Kelly | |
| 2018/0188068 A1 | 7/2018 | Droege | |
| 2018/0189729 A1 | 7/2018 | Droege | |
| 2018/0202818 A1 | 7/2018 | Zhang | |
| 2018/0225796 A1 | 8/2018 | Liu | |
| 2018/0231984 A1 | 8/2018 | Alonso-Mora | |
| 2018/0300660 A1 | 10/2018 | Coan | |
| 2018/0336510 A1 | 11/2018 | DaCosta | |
| 2019/0026662 A1 | 1/2019 | Kring | |
| 2019/0035037 A1 | 1/2019 | Chase | |
| 2019/0064801 A1 | 2/2019 | Frazzoli | |
| 2019/0113361 A1 | 4/2019 | Droege | |
| 2019/0114583 A1 | 4/2019 | Ripert | |
| 2019/0130320 A1 | 5/2019 | Friend | |
| 2019/0130350 A1 | 5/2019 | Nguyen | |
| 2019/0130354 A1 | 5/2019 | Han | |
| 2019/0132699 A1* | 5/2019 | Nikulkov | H04W 4/35 |
| 2019/0132702 A1 | 5/2019 | Ehsani | |
| 2019/0163710 A1 | 5/2019 | Haghighat Kashani | |
| 2019/0289427 A1 | 9/2019 | Lin | |
| 2019/0295440 A1 | 9/2019 | Hadad | |
| 2020/0033156 A1 | 1/2020 | Droege | |
| 2020/0065734 A1 | 2/2020 | Szybalski | |
| 2020/0074524 A1 | 3/2020 | Smith | |
| 2020/0090248 A1 | 3/2020 | Zeng | |
| 2020/0151660 A1 | 5/2020 | Warr | |
| 2020/0160264 A1 | 5/2020 | Silverman | |
| 2020/0265366 A1* | 8/2020 | Mo | G06Q 10/06315 |
| 2020/0311618 A1 | 10/2020 | Eichler | |
| 2020/0333161 A1 | 10/2020 | Droege | |
| 2020/0374650 A1 | 11/2020 | Jung | |

FOREIGN PATENT DOCUMENTS

| | | |
|---|---|---|
| KR | 10-20170054739 | 5/2017 |
| WO | WO 2001052163 | 7/2001 |
| WO | WO 2017/148202 | 9/2017 |
| WO | WO 2018/209263 | 11/2018 |

OTHER PUBLICATIONS

Singliar, Tomas, Demand Forecasting for Shipping and Distribution, Azure AI Gallery, Jun. 26, 2017.

Chen, P., Crowdsourced Delivery for Last-Mile Distribution: An Agent-Based Modeling and Simulation Approach, IEEE, 2017.

Written Opinion in PCT/US2018/058859 dated Oct. 21, 2019.

IPRP dated Nov. 7, 2019 in PCT/US2018/058554.

Technological Disruption and Innovation in Last-Mile Delivery, Stanford Value Chain Innovation Initiative, Stanford, Jun. 2016.

Collaborative Urban Logistics: Synchronized Last-Mile Logistics for Sustainable, Efficient Urban Delivery, TLI Asia Pacific White Paper Series, vol. 13, Nov. 2013.

Grand Junction Local Delivery Reinvented—Last Mile Platform Help, Grand Junction Inc., PerfectLastMile.com, 2016.

Computerised Vehicle Routing and Scheduling (CVRS) for Efficient Logistics, Department for Transport, 2005.

ISR and Written Opinion in PCT/US2018/058554 dated Feb. 13, 2019.

ISR and Written Opinion in PCT/US2018/058859 dated Feb. 20, 2019.

Reutt, Alex "Deliveroo Frank About Improved Algorithm Improving Service Times by 31%", Oct. 17, 2017 (https://www.itwire.com/home-it/ 80398-deliveroo-frank-about-improved-algorithm-improving-service-times-by-31.html).

IPRP dated Aug. 25, 2020 in PCT/US2019/051993.

ISR and Written Opinion in PCT/US2019/051993 dated Sep. 19, 2019.

HungryBBQ Delivery Details, Sep. 11, 2019 www.hungrybbq.com/delivery_info.php.

Eatzcatering FAQ, Nov. 13, 2018 www.eatzcatering.com.

* cited by examiner

OPTIMIZING SERVICE REQUESTS IN TRANSPORT SUPPLY-CONSTRAINED SUB-REGIONS

BACKGROUND

On-demand food delivery requires requesting users to request a menu item from menu listings of individual suppliers. The requests are typically processed by the restaurants themselves, which can either deliver the requested item after preparation, or the requesting user can coordinate with a third-party to pick up the requesting item for personalized delivery.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
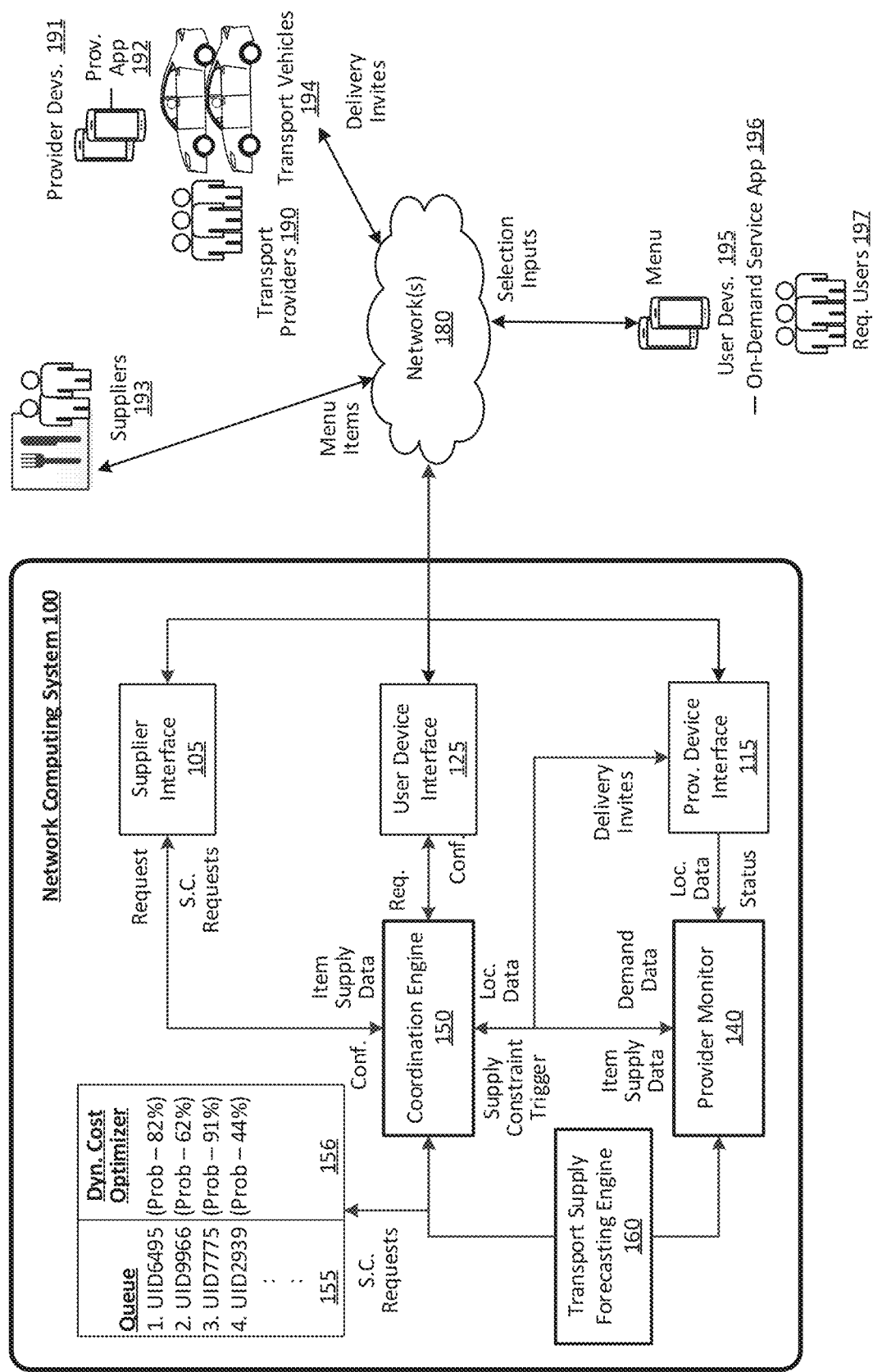
FIG. 1 is a block diagram illustrating an example network computing system implementing an on-demand coordinated delivery service, in accordance with examples described herein.

A delivery service (e.g., an on-demand food delivery service) can be managed by a network-based computing system by connecting requesting users, delivery drivers and/or vehicles, and menu item suppliers (e.g., restaurants) via designated applications specific to the delivery service. Typically, menu item requests are fulfilled by coordinating between available vehicles and the menu item suppliers to ensure the requested item has been prepared or can be prepared quickly, and a selected vehicle can be assigned to pick up the requested item before the request is made (e.g., based on demand forecasting) or to pick up the requested item after the request is made, and deliver the item to the requesting user. In this typical request and delivery process, the computing system receives a request, then transmits the request to the requested menu item supplier for preparation, and finally selects a vehicle from a set of candidate vehicles to deliver the item to the requesting user.

However, certain inefficiencies exist in these typical request and delivery processes that can result in high costs for operating the delivery service. For example, when the computing system confirms a delivery request for a specific menu item for a requesting user, but the supplier of the requested menu item is unable to prepare it (e.g., the supplier has run out of ingredients), the goodwill of the service can suffer when the confirmed request is subsequently canceled. In another scenario, the supply of available delivery drivers or vehicles for a particular area can be constrained in relation to menu item request demand from requesting users. In the typical request and delivery process, a high cost result can occur when the request is transmitted to the menu item supplier, the menu item supplier prepares the requested item, but no delivery vehicle is available to fulfill the request (e.g., due to a failure in vehicle supply forecasting for a specified sub-region, a higher than usual volume of received item requests, or lower than usual transport supply conditions). In such a scenario, the operator of the delivery service may be accountable for the cancellation of the request as well as the loss of the prepared menu item.

To address the technical problems arising from inaccurate vehicle supply forecasting, the computing system can monitor current vehicle supply conditions and current request demand for each sub-region of a delivery service region. When supply-constrained conditions exist (e.g., based on an equilibrium threshold being crossed between received requests versus available vehicles, and/or a divergence threshold between forecasted vehicle supply and current vehicle supply), the computing system can be triggered to operate under a supply-constrained mode, as opposed to a default mode or standard mode, for the given sub-region, which can result in a set of logistical optimizations for the sub-region that significantly reduces or eliminates the costs and risks associated with request cancellation and/or menu item loss.

In various examples, when the supply-constrained mode is triggered for a given sub-region, the computing system can initiate the set of logistical optimizations by placing each received menu item request into a request queue, and associating each request in the queue with a timer and dynamic cost optimizer that dynamically (e.g., every five seconds) determines a set of probabilities for one or more of the following: (i) the user self-cancelling the request at any given moment (e.g., due to the delay in confirming the request and/or releasing the request to the menu item supplier), or (ii) matching the requesting user to an available delivery vehicle given the supply-constrained conditions.

The computing system determines an expected cost of continuing to delay the release of the request to the menu item supplier (e.g., lost opportunity of the requesting user self-cancelling) versus an expected cost of releasing the request to the menu item supplier (e.g., including the risk of not securing a delivery vehicle). As described herein, releasing the request to the menu item supplier can correspond to transmitting, over one or more networks, a message or set of data that identifies the item(s) that the menu item that a requesting user has ordered to a computing device associated with the menu item supplier (e.g., a device on premise at a restaurant or kitchen). An operator of the menu item supplier can accept or decline the request.

When the probability of finding a matching delivery driver or vehicle exceeds a certain threshold—or when the probability that the request will go unfulfilled drops below a certain threshold—the computing system can release the request to the menu item supplier. In other words, given the dynamic probabilities of self-cancellation by the user and of finding a matching driver or vehicle for delivery, the computing system can determine when to either transmit a request cancelation to the requesting user or transmit the request to the menu item supplier for fulfillment.

Accordingly, by associating each request in the supply-constraint queue with a dynamic cost optimizer, the computing system can avoid the highest cost result of both a request cancelation instigated by the computing system and menu item loss. Furthermore, by triggering the supply-constrained queue for supply-constrained sub-regions, the computing system can minimize the costs to the on-demand delivery service (e.g., cost of lost opportunity, reduced goodwill, recompensing menu item suppliers, etc.).

Among other benefits, examples described herein achieve a technical solution to current technical problems experienced in the field of remote, on-demand item delivery services. In particular, the computing system described herein triggers a request queue and dynamic cost optimization techniques before releasing item requests to item suppliers when the supply of transport providers crosses below a certain threshold. Using this probability-based approach to item request fulfillment in transport supply constrained conditions significantly mitigates or eliminates current limitations to provider-supply forecasting models currently implemented in the industry.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. In certain examples, one or more computing device can have direct API integration into another computing device to at least partially perform the operations described herein (e.g., a point-of-sale terminal of a menu item supplier having direct API connectivity with the disclosed computing system). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example network computing system implementing an on-demand coordinated delivery service, in accordance with examples described herein. At any given time or in accordance with a set schedule, each participating menu item supplier 193 (e.g., a restaurant) can connect with the network computing system 100 over one or more networks 180 via a supplier interface 105 to provide the offered menu items for coordinated on-demand delivery. As described herein, the menu items can comprise images and/or descriptive terms of food and/or drink items to be provided by the supplier 193 for on-demand delivery.

The network computing system 100 can further include a user device interface 125 that connects with user devices 195 executing an on-demand service application 196. Requesting users 197 can select from a menu of listed menu items for on-demand delivery via a user interface of the delivery service application 196. The computing system 100 can further include a provider device interface 115 and can receive location data, via the provider device interface 115, from the provider devices 191 of drivers 190 or vehicles 194 operating throughout the delivery service region (e.g., a metropolitan area). In certain examples, each transport vehicle 194 may also include an inventory of menu items being offered to the requesting users 197.

Thus, according to certain implementations, in coordinating the on-demand delivery service, the network computing system 100 can take into account the inventory of menu items being currently transported in each transport vehicle 194. For example, in certain examples, the computing system 100 can forecast demand for the menu items throughout the delivery service region and coordinate with the menu item suppliers 193 and delivery providers 191 to prepare the items and load them into the delivery vehicles, which the coordination engine 150 can then route to forecasted "hot spots" to anticipate menu items requests and induce faster delivery.

This is distinct from traditional delivery services, in which an item is requested by a person, and then prepared and packaged by the item supplier and finally delivered by a vehicle. The on-demand service described herein, can provide for more immediate on-demand delivery by forecasting menu item demand (e.g., based on historical data), coordinating the loading of inventory (e.g., comprising menu items from the suppliers 193) onto the transport vehicles 194 prior to receiving requests, and in some aspects, routing the transport vehicles 194 around the given service region with inventory on-board based on the demand forecasting while receiving menu item requests from the user devices 195.

In variations, examples described herein can coordinate between suppliers 193, requesting users 197, and drivers 190 or transport vehicles 194 in a more traditional manner. For example, the vehicles 194 may operate without being pre-supplied with menu items from the suppliers 193. When a item request is received from a requesting user 197, the coordination engine 150 can submit the request to a supplier 193 that prepares the requested item coordination engine 150 and matches the request to an optimal driver 190 or vehicle 194 for delivery to the user 197.

For each item request received from a requesting user 197, the coordination engine 150 can determine the current locations, current routes and upcoming deliveries, and/or the current inventory of proximate transport vehicles 194 to the current location of the requesting user 197 (e.g., within four miles). The coordination engine 150 can select a most optimal transport vehicle 194 based on distance, time, inventory, and/or additional utility metrics, such as transport vehicle supply, inventory supply, and menu item demand within individual localities or sub-regions of the delivery service region. The coordination engine 150 may then transmit a delivery invitation to the driver device 191 of the driver 190 of the optimal transport vehicle 194. The driver 190 can accept or decline the invitation.

If accepted, the coordination engine 150 can provide the provider device 191 with a shortest or most optimal route to the rendezvous location with the requesting user 197, or can add the delivery location to a current route and delivery schedule of the vehicle 194. If declined, the coordination engine 150 can repeat the optimization process of identifying a next most optimal transport vehicle 194, and transmit another delivery invitation to the driver 190 of that vehicle 194—and repeat the sequence, if needed, until a driver 190 or vehicle 194 accepts the delivery invitation.

Upon selection of a menu item by the user 197 (whether recommended or not), a coordination engine 150 of the network computing system can communicate with drivers 190 of transport vehicles 194 via an executing driver application 192 and a driver device interface 115 to coordinate the on-demand delivery of the selected menu item. For example, the requesting user 197 may make a selection on a menu item and confirm purchase via the on-demand service application 196 executing on the user's computing device 195. Request data indicating the selected menu item can be transmitted to the network computing system 100 over the one or more networks 180, and can be processed by the coordination engine 150. In various examples, the menu item request can include location information indicating the current location of the user 197, or the user 197 can input a rendezvous location to meet with a delivery driver 190.

According to examples described herein, the computing system 100 can further include a provider monitor 140 and transport supply forecasting engine 160. The provider monitor 140 can receive the location data from the transport vehicles 194, and can further receive status information of the transport providers 190, which can indicate availability, whether the vehicle 194 is currently matched to a request, the current inventory of the vehicle 194, and the like. Based on the location data, the provider monitor 140 can monitor current transport provider supply conditions in each sub-region of the delivery service region. For example, the provider monitor 140 can parse the delivery service region into sub-regions and monitor the supply conditions of the transport providers 190 at any given time.

In certain examples, the computing system 160 can further include a transport supply forecasting engine 160—distinct from forecasting menu item demand from requesting users 197, or forecasting menu item supply from the suppliers 193. The transport supply forecasting engine 160 can forecast the supply of available transport providers 190 and/or transport vehicles 194 in each sub-region or select sub-regions (e.g., low demand or more rural sub-regions) of the delivery service area. In certain implementations, the forecasting engine 160 can generate these supply forecasts based historical data, time of day, day of the week, current weather conditions, and the like. Thus, for any given sub-region at any future given time, the forecasting engine 160 can generate a supply forecast for transport providers 190 and/or vehicles 194, which can be utilized by the coordination engine 150 and the provider monitor 140 to anticipate transport supply shortages and/or compel the movement of transport providers 190 and/or vehicles 194 to supply constrained sub-regions (e.g., via a financial incentive, surge pricing tools, through expedition routing, and the like).

In various implementations, the provider monitor 140 can receive demand data from the coordination engine 150, which can indicate the current demand from requesting users 197 for each menu item in each sub-region. Additionally or alternatively, the provider monitor 140 can receive item supply data from the coordination engine 150, indicating the current availability of menu items and/or current capacity to make menu items by the item suppliers 193. Based on one or more of a transport supply forecast for a given sub-region, the item supply data, the demand data, and/or the current transport supply conditions, the provider monitor 140 can trigger a supply constrained mode for the given sub-region. This supply constraint trigger can indicate to the coordination engine 150 that the supply conditions of transport providers 190 and/or available vehicles 194 for the sub-region is constrained in comparison to current item demand and/or item availability.

In one example, the provider monitor 140 triggers the supply constrained mode when the number of available transport providers in a target sub-region is less than a current demand for menu items. For example, the provider monitor 140 can dynamically determine a ratio between current item requests received from the sub-region and the current number of available transport providers. When that ratio drops below a certain equilibrium threshold (e.g., 75%), the provider monitor 140 can trigger the supply-constrained mode. In alternative examples, the provider monitor 140 can perform an optimization based on the current demand for menu items, current available transport providers 190, and/or available menu items to determine an acceptable or optimal range of transport providers in the sub-region to maintain equilibrium in the target sub-region. When the number of available transport providers 190 drops below that acceptable range, the provider monitor 140 can trigger the supply-constrained mode.

In various implementations, the provider monitor 140 can execute a statistical model, using the demand data, item supply data, and/or location and status data of transport providers 190 to predict the likelihood that a received item request will go unfulfilled. In such implementations, the coordination engine 150 can determine whether to reject or cancel the item request based on the predicted likelihood. For example, if the predicted likelihood is above a predetermined threshold (e.g., 75%), then the coordination engine 150 can transmit a cancelation notification to the computing device 195 of the user 197 that transmitted the item request. In further examples, if the predicted likelihood is above the predetermined threshold, the coordination engine 150 can input the item request into a queue 155 and associate the request with a dynamic cost optimizer 156, as described herein.

In various examples, upon receiving the supply constraint trigger for a given sub-region, the coordination engine 150 can initiate a supply-constrained mode for that sub-region. As provided herein, a sub-region can comprise a physical area of the delivery service region encompassed by a geofence (e.g., based on population, like area, or a combination of the two). In variations, a sub-region can comprise an area in which the menu items of suppliers 193 can practically be delivered (e.g., the historical extent in each direction of a supplier 193 in which requests area made for menu items from that supplier 193). In further variations, a sub-region can comprise an area in which menu items from a particular supplier 193 or group of suppliers 193 are offered to requesting users 197 by the computing system 100 (e.g., through the service app 196). It is further contemplated that the sub-regions can be supplier-specific, in which each supplier 193 is attributed with its own sub-region. Alternatively, the sub-regions can be fixed via geo-fences, and can be associated with any number of menu item suppliers 193 that supply menu items to requesting users 197.

In the supply constrained mode, the coordination engine 150 can generally delay releasing menu item requests from requesting users 197 to the item suppliers 193 until the coordination engine 150 has a high certainty of a transport provider 190 being available to deliver the requested item. For example, the supply-constrained conditions may be quite brief, so the coordination engine 150 can take a "wait-and-see" approach for the next few minutes before either canceling the request (e.g., transmitting an unavailability message to the requesting user 197 with a coupon for a future menu item) or releasing the request to the menu item supplier 193. By releasing the request to the item supplier 193, the coordination engine 150 does not require certainty that a vehicle 194 or provider 190 is currently available to make the delivery. Rather, the coordination engine 150 can associate each received request with a probability of fulfillment at any given time given a set of fulfillment probability metrics.

In certain examples, once a supply-constraint trigger is received for a particular sub-region, the supply constrained mode executed by the coordination engine 150 can cause the coordination engine 150 to implement a queue 155 for the sub-region. As such, the coordination engine 150 can input each received item request from each requesting user 197 within the triggered sub-region into the queue 155 and a dynamic cost optimizer 156 can be triggered to dynamically determine a probability that the item request will be fulfilled within a set of limitations (e.g., a time limitation from when the request was received) and/or fulfillment probability metrics. In one example, the dynamic cost optimizer 156 continuously determines the fulfillment probability for any given item request. In variations, the dynamic cost optimizer 156 periodically (e.g., once every twenty seconds) determines the fulfillment probability for any given item request.

In various examples, given the supply-constrained conditions of transport providers 190, the dynamic cost optimizer 156 can receive as input the location data of the current transport providers 190 in the target sub-region, the current status of each provider 190, the locations of requesting users 197 who have submitted the requests, and the location of the supplier(s) 193 of the requested menu item(s). In further examples, the cost optimizer 156 can further receive as input general or average cancelation times for users 197 and/or increasing cancelation rates of users 197 given increasing delay times. In still further examples, the dynamic cost optimizer 156 can further receive as input user-specific information about the requesting user 197, such as cancelation history, utilization history (e.g., indicating frequency of engagement with the on-demand delivery service), and the like. These inputs can comprise the fulfillment probability metrics, with certain inputs changing continuously and others remaining static.

In some aspects, details of each menu item request can be included as input for the dynamic cost optimizer 156. For example, the specified item requested, the size of the item request (e.g., twenty menu items versus a single menu item), or the price associated with the item request (e.g., a five dollar item request versus a fifty dollar item request) can be factored into the calculated fulfillment probability. In certain examples, the dynamic cost optimizer 156 can attribute a priority weighting to any one of the inputs (e.g., higher valued requests), which can cause the coordination engine 150 to increase or decrease priority in matching the request to a particular transport provider 190.

Any one or more of the above-discussed inputs can enable the dynamic cost optimizer 156 to calculate a probability that the item request will be fulfilled prior to a time expiration (e.g., two minutes) or an estimated time that the requesting user 197 will cancel the request. When this probability crosses an upper threshold (e.g., 95% probability of fulfillment), then the coordination engine 150 can release the request from the queue 155 and transmit the request to the relevant supplier 193. Thereafter, the coordination engine 150—with high confidence of successful fulfillment—can monitor the transport providers 190 and vehicles 194 in the supply constrained sub-region and match the request to a transport provider 190 and/or vehicle 194 for item delivery to the requesting user 197. Conversely, when the probability crosses a lower threshold (e.g., 65%), the coordination engine 150 can mitigate the potential costs resulting from an unfulfilled request by canceling the request and providing a mitigative gratuity or token to the requesting user 197 (e.g., a coupon for a future requested item).

Specifically, the coordination engine 150 is prevented from releasing the item request to the supplier 193 until a minimum fulfillment probability is met for the item request in the queue 155—as determined by the dynamic cost optimizer 156. It is contemplated that this minimum fulfillment probability will increase as the relative costs of delay increase.

In other words, the dynamic cost optimizer 156 prevents the item request from being released to the relevant menu item supplier 193 as long as the expected cost incurred from releasing the item request is greater than the expected cost incurred from delaying further (e.g., until a next probability determination). In such examples, the dynamic cost optimizer 156 can dynamically determine each of these expected costs (e.g., continuously or based on a scan interval) based on the inputs described herein. When the expected cost from releasing the item request drops below the expected cost from delaying further, the coordination engine 150 can release the item request from the queue 155 and transmit the request to the relevant supplier 193.

In further implementations, the dynamic cost optimizer 156 can factor in the fulfillment probability or cancelation of one menu item request in the queue 155 into other items in the queue 155. For example, when two item requests originate within a certain proximity of each other, the cancelation of one item request can cause an increase in the fulfillment probability of the other request. Accordingly, in the calculation of a fulfillment probability of one menu item request in the queue 155, the dynamic cost optimizer 156 can take into account cancelations, fulfillments, and/or fulfillment probabilities of other item requests within the supply-constrained sub-region and/or neighboring sub-regions.

It is contemplated that a primary goal of the dynamic cost optimizer 156 is to significantly reduce or minimize the costs of an unfulfilled item request. This includes the assumed reduction in goodwill from a user 197 when that user's 197 request is canceled—either by the user 197 due to delay, or by the computing system 100 due to low probability of fulfillment. These costs can further include the costs associated with a wasted menu item prepared by a supplier 193 and requested by a user 197, but not delivered due to the transport supply-constrained conditions. In such a scenario, the delivery service typically reimburses the menu item supplier 193 for the wasted menu item and provides the requesting user 197 with a mitigative token for the cancelation.

At any given time, the supply conditions for transport providers 190 in the target sub-region can normalize given current demand from requesting users 197 and availability of menu items from the suppliers 193. When conditions are normalized, the provider monitor 140 can trigger the coordination engine 150 to initiate a standard coordination mode in which menu item requests are automatically released to the suppliers 193 when received, with a relative certainty that transport supply conditions are currently robust.

Computing Device

Figure 2:
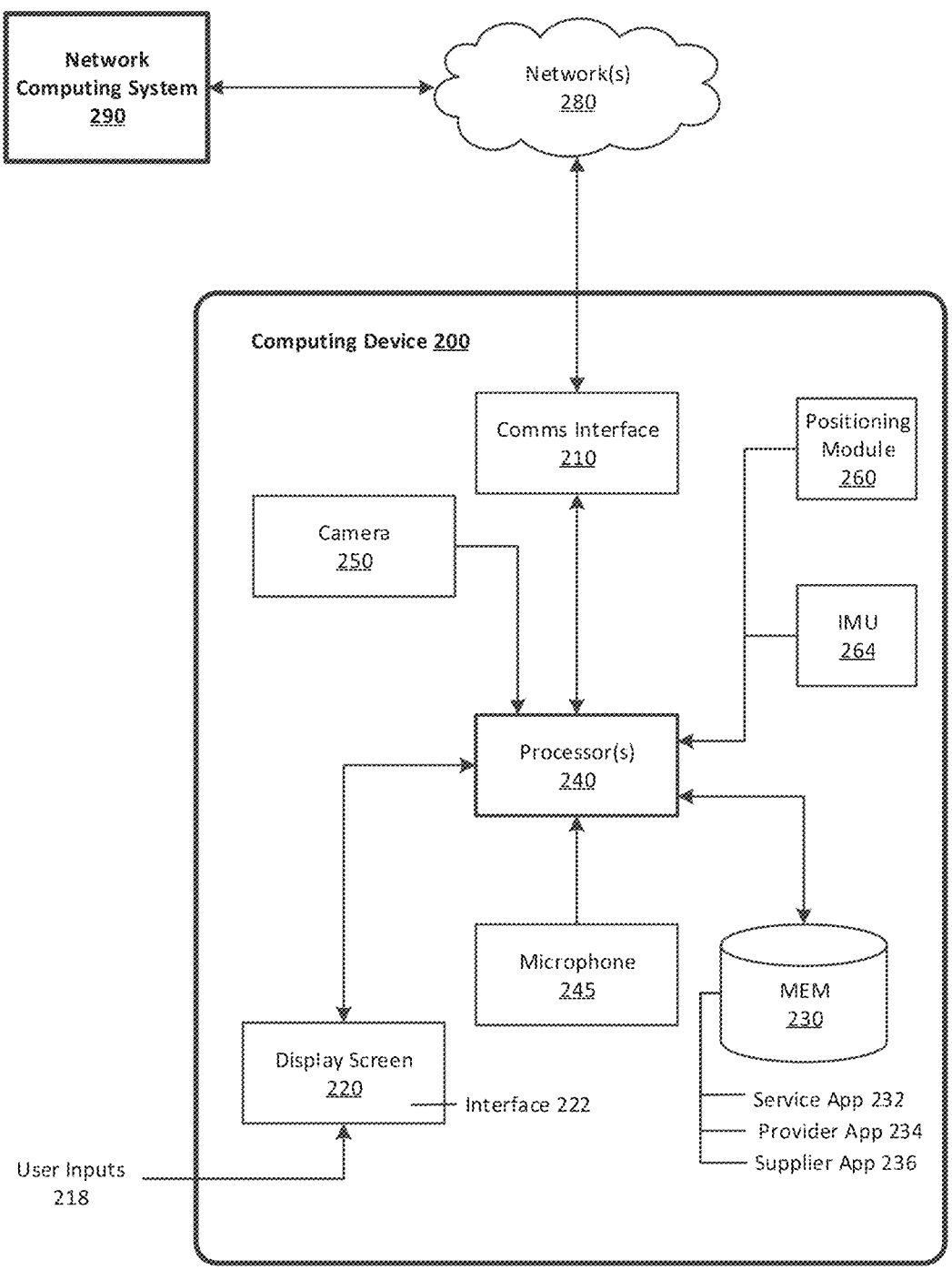
FIG. 2 is a block diagram illustrating an example computing device executing a service application for communicating with a network computing system, according to examples described herein.

FIG. 2 is a block diagram illustrating an example computing device executing and operating a delivery service application 232 for communicating with a network computing system, according to examples described herein. In many implementations, the computing device 200 can comprise a mobile computing device, such as a smartphone, tablet computer, laptop computer, VR or AR headset device, and the like. As such, the computing device 200 can include telephony features such as a microphone 245, a camera 250, and a communication interface 210 to communicate with external entities using any number of wireless communication protocols. The computing device 200 can further include a positioning module 260 and an inertial measurement unit 264 that includes one or more accelerometers, gyroscopes, or magnetometers. In certain aspects, the computing device 200 can store a designated delivery service application 232 in a local memory 230. In variations, the memory 230 can store additional applications executable by one or more processors 240 of the computing device 200, enabling access and interaction with one or more host servers over one or more networks 280.

The computing device 200 can be operated by a requesting user 197 through execution of the on-demand service application 232. The computing device 200 can further be operated by a transport provider 190 through execution of a provider application 234. Alternatively, the computing device 200 can be operated by a supplier 193 through execution of a supplier application 236. For requesting user 197 implementations, the user can select the service application 232 via a user input on the display screen 220, which can cause the service application 232 to be executed by the processor 240. In response, a user application interface 222 can be generated on the display screen 220, which can display available menu items and enable the user to submit an item request for any displayed item.

For transport provider 190 implementations, the provider can select the provider application 234 via a user input 218 on the display screen 220, which can cause the provider application 234 to be executed by the processor 240. In response, a provider application interface 222 can be generated on the display screen 220, which can enable the provider to receive delivery invitations, and accept or decline these invitations. The provider app interface 222 can further enable the transport provider to select a current status (e.g., available, on-duty, on-break, on-trip, busy, unavailable, and the like).

For supplier 193 implementations, the supplier can select the supplier application 236 via a user input 218 on the display screen 220, which can cause the supplier application 236 to be executed by the processor 240. In response, a supplier application interface 222 can be generated on the display screen 220, which can enable the supplier to provide menu items for on-demand delivery, receive item requests, and accept or reject these requests. In accepting a request, the supplier may then prepare the requested menu item, and provide the prepare menu item to a transport provider for delivery to the requesting user.

In some examples, a menu item supplier 193 can be provided with an option to automatically accept all received item requests. Accordingly, once a menu item request is released by the coordination engine 150 to this supplier 193, the coordination engine 150 can operate under the assumption that the requested item will be prepared by the supplier 193.

As provided herein, the applications 232, 234, 236 can enable a communication link with a network computing system 290 over one or more networks 280, such as the network computing system 100 as shown and described with respect to FIG. 1. The processor 240 can generate user interface features using content data received from the network computing system 290 over network 280. Furthermore, as discussed herein, the applications 232, 234, 236 can enable the network computing system 290 to cause the generated interface 222 to be displayed on the display screen 220.

In various examples, the positioning module 260 can provide location data indicating the current location of the user, transport provider, and supplier to the network system 290 to, for example, enable the network computing system 290 to coordinate on-demand delivery of selected items. In examples described herein, the network computing system 290 can transmit content data to the communication interface 210 of the computing device 200 over the network(s) 280. The content data can cause the executing service application 232 to display the respective interface 222 for each executing application 232, 234, 236. Upon selection of a desired menu item by a requesting user, the service application 232 can cause the processor 240 to transmit an item request to the network computing system 290 to enable the computer system 290 to coordinate with a supplier to prepare the item, and a transport provider to rendezvous with the user at either the user's current location, or a selected rendezvous location.

User Interfaces

Figure 3A:
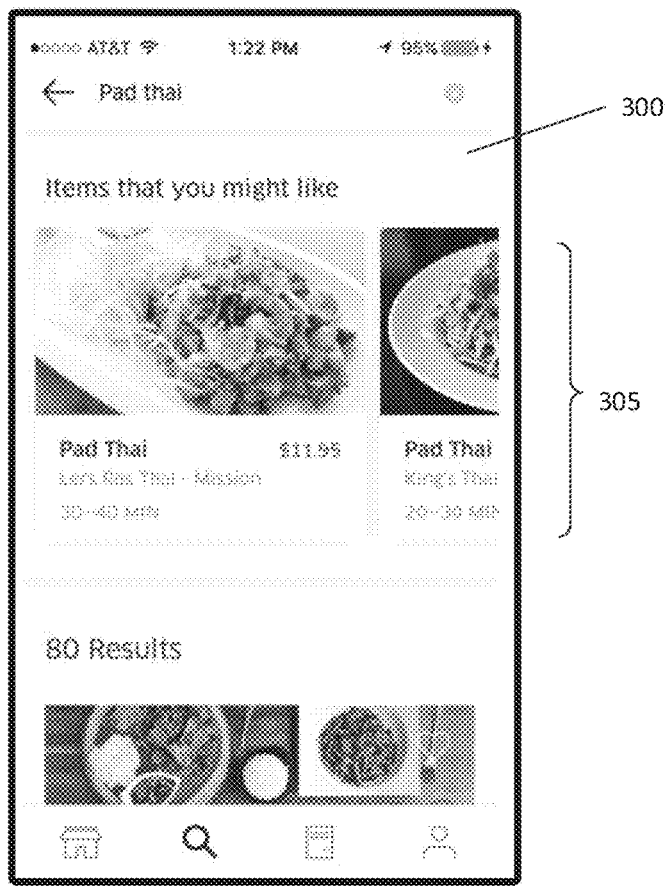
FIGS. 3A and 3B illustrate example user interfaces listing available menu items, according to examples described herein.
Figure 3B:
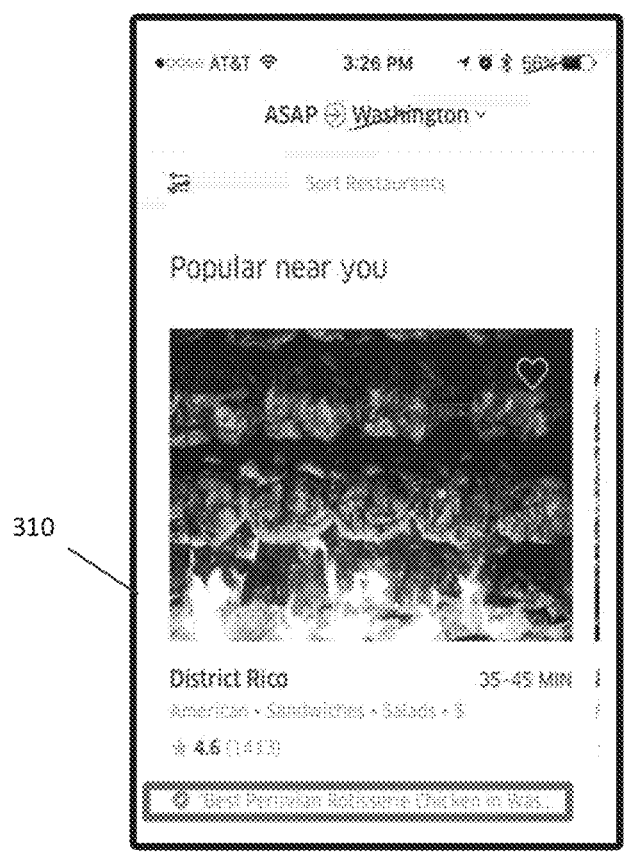

FIGS. 3A and 3B are example user interfaces showing menu items on a computing device 200, according to examples described herein. Referring to FIG. 3A, the user interface 300 can be generated on the display screen 220 of the user computing device 200. In the example shown, the network computing system 100 provides available menu items from suppliers 193 as a scrollable list of menu items 305. Furthermore, the scrollable list 305 may be based on an initial filter inputted by the user, such as a text search or voice input for "Pad Thai." Accordingly, the initial filter can cause the network computing system 100 to filter out any available menu items that do not match the user's search (or similar spellings of the search), and the resultant list can be provided based on each of the recommendation metrics described herein.

Referring to FIG. 3B, the user interface 310 displayed on the user computing device 200 can also provide a general recommendation based on the preferences of other users (e.g., when historical data is lacking for the user, or upon an input by the user to provide a popular recommendation). The network computing system 100 can determine a menu item supplier 193 and/or menu item from that supplier 193 that is widely popular (e.g., based on number of orders and/or rating), and cause the menu item to be displayed prominently on the user interface 310. In either user interface 300, 310 of FIG. 3A or FIG. 3B, the user can select a menu item to configure an item request, which can be transmitted to the computing system 100 as described herein.

Methodology

Figure 4:
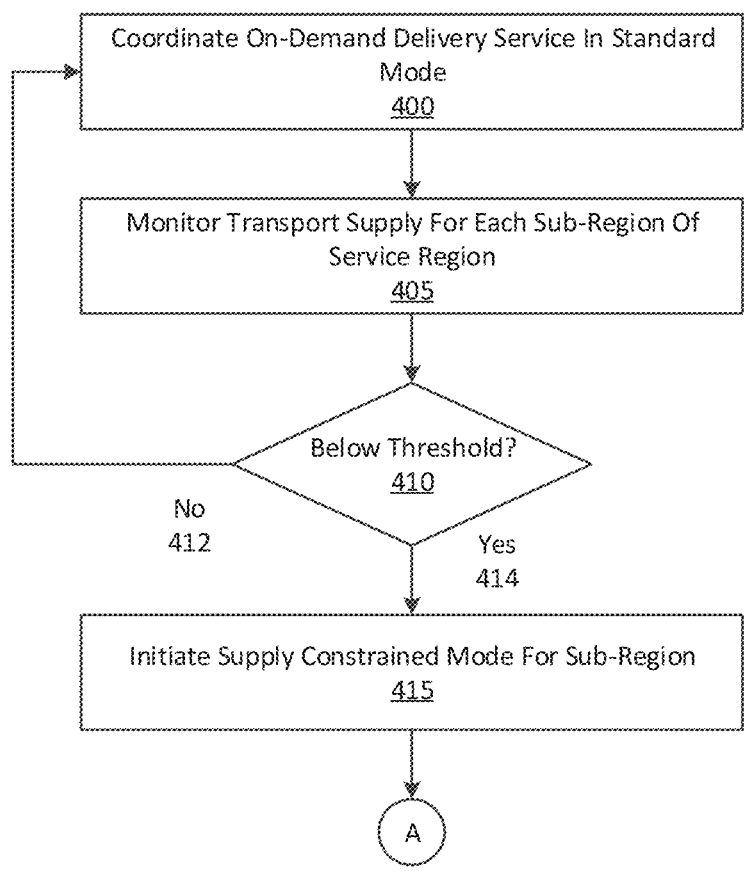
FIG. 4 is a flow chart describing an example method of coordinating menu item delivery, according to various examples.
Figure 5:
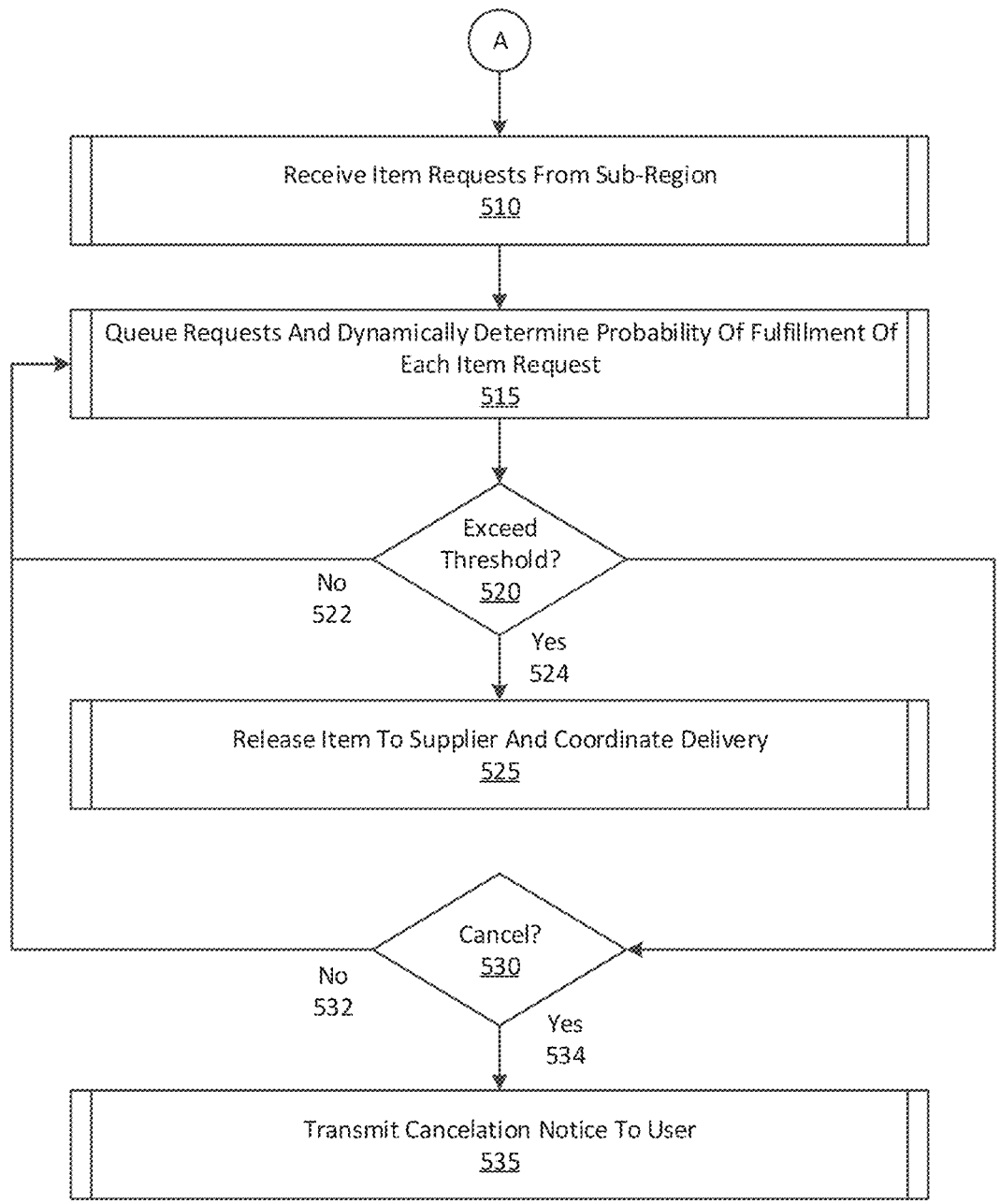
FIG. 5 is a flow chart describing an example method of implementing dynamic cost optimization for menu item delivery in constrained conditions, according to various examples.

FIGS. 4 and 5 are flow charts describing an example method of coordinating menu item delivery and implementing dynamic cost optimization for menu item delivery in supply-constrained conditions, according to various examples. In the below description of FIGS. 4 and 5, reference may be made to reference characters representing various features of FIGS. 1 and 2. Furthermore, the processes described with respect to FIGS. 4 and 5 may be performed by an example network computing system 100 as shown and described with respect to FIG. 1.

Referring to FIG. 4, the computing system 100 can coordinate an on-demand delivery service for a service region in a standard mode (400). In this standard mode, the computing system 100 receives item requests from requesting users 197, submits the requests to relevant suppliers 193, and coordinates with transport providers 190 or vehicles 194 to pick-up the items from the suppliers 193 and rendezvous with the requesting users 197 for delivery. The computing system 100 can further monitor transport supply conditions for each sub-region of the delivery service region (405). As described herein, the sub-region can comprise a physical area of the delivery service region encompassed by a geo-fence (e.g., based on population, like area, or a combination of the two). In variations, the sub-region can comprise an area in which menu items from one or more suppliers 193 are offered to requesting users 197 by the computing system 100 (e.g., in which the menu items show up as offers on user devices).

According to various examples, the computing system 100 can determine whether the transport supply within a particular sub-region is below a predetermined equilibrium threshold (410). If not (412), then the computing system 100 can continue to coordinate on-demand delivery in the standard mode (400). However, if so (414), then the computing system 100 can initiate a supply-constrained mode for the sub-region (415), which is described in detailed with respect to FIG. 5.

Referring to FIG. 5, in the supply-constrained mode, the computing system 100 can receive items requests from requesting users 197 in the sub-region (510). The computing system 100 can queue each received item request and dynamically determine a probability of fulfillment of each item request (515). In doing so, the computing system 100 can execute a dynamic cost optimizer 156 for each request which determines the probability of fulfillment given a set of fulfillment probability metrics specific to each request, as described above with respect to FIG. 1. At any given time, the computing system 100 can determine whether the minimum threshold for fulfillment has been exceeded (520). If not (522), then the computing system 100 can continue delaying the release of the request and recalculating the fulfillment probability in a subsequent iteration (515). However, if the minimum threshold is exceeded (524), then the computing system 100 can release the request to the relevant supplier 193 and coordinate delivery (525).

In conjunction with determining the fulfillment probability, the dynamic cost optimizer 156 can generally determine whether to cancel the item request from the user (530). In certain implementations, this determination can flow from the same fulfillment probability calculation described herein. In such examples, if the fulfillment probability remains above a certain cancelation threshold (e.g., 65% fulfillment probability) (532), then the computing system 100 can keep the request in the queue 155 and continue with the dynamic cost optimization calculation. However, when the fulfillment probability drops below the cancelation threshold (534), the computing system 100 can cancel the request by transmitting a cancelation notice to the requesting user 197 (535). As such, the dynamic cost optimizer 156 prevents the item request from being released to the relevant menu item supplier 193 as long as the expected cost incurred from releasing the item request to the supplier 193 is greater than the expected cost incurred from delaying further (e.g., until a next probability determination).

Hardware Diagram

Figure 6:
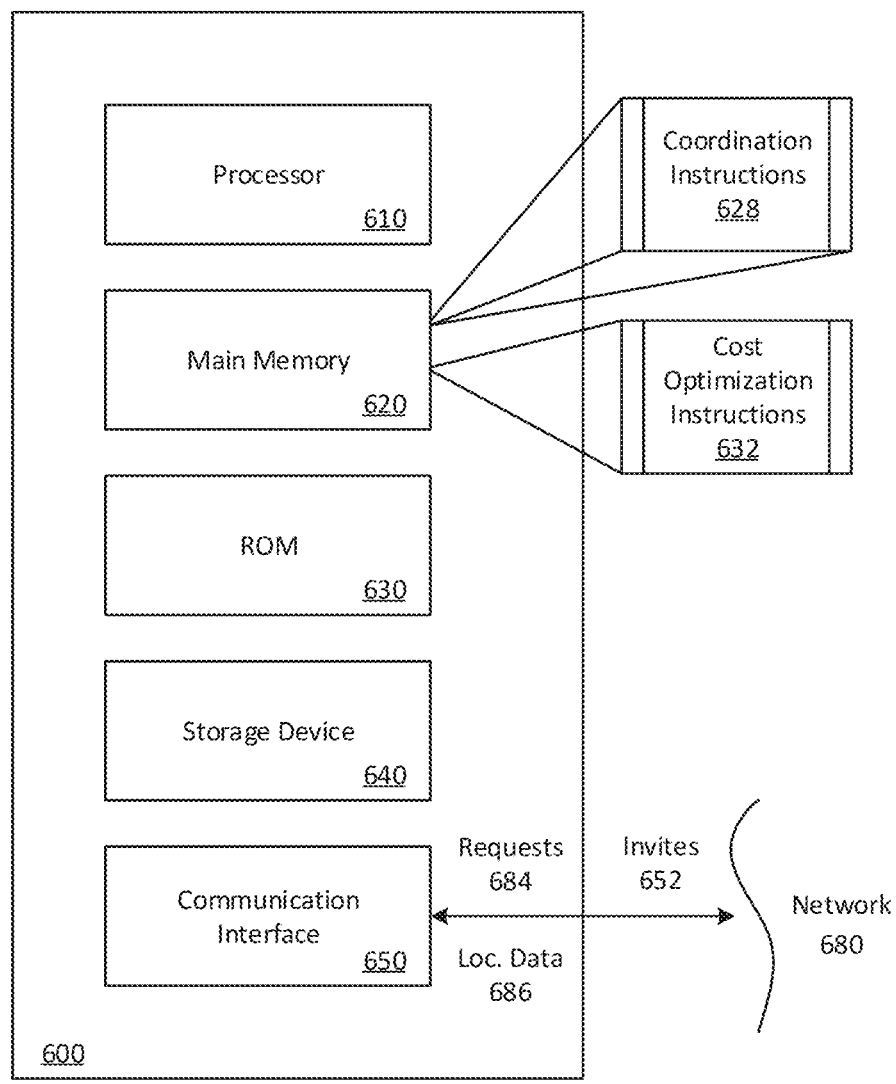
FIG. 6 is a block diagram that illustrates a computer system upon which examples described herein may be implemented.

FIG. 6 is a block diagram that illustrates a computer system upon which examples described herein may be implemented. A computer system 600 can be implemented on, for example, a server or combination of servers. For example, the computer system 600 may be implemented as part of a network service, such as described in FIGS. 1 through 5. In the context of FIG. 1, the computer system 100 may be implemented using a computer system 600 such as described by FIG. 6. The computer system 100 may also be implemented using a combination of multiple computer systems as described in connection with FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate with one or more networks 680 (e.g., cellular network) through use of the network link (wireless or wired). Using the network link, the computer system 600 can communicate with one or more computing devices, one or more servers, one or more databases, and/or one or more self-driving vehicles. In accordance with examples, the computer system 600 receives requests from mobile computing devices of individual users. The executable instructions stored in the memory 630 can include coordination instructions 628 and cost optimization instructions 632.

By way of example, the instructions and data stored in the memory 620 can be executed by the processor 610 to implement the functions of an example computer system 100 of FIG. 1. In various examples, the processor 610 can execute the coordination instructions 628 to receive menu item requests and coordinate delivery of menu items from suppliers to requesting users. In certain implementations, the processor 910 executes the cost optimization instructions 632 for a particular sub-region when that sub-region is in a supply-constrained transport environment. The cost optimization instructions 632 cause the processor 610 to queue received request from a particular sub-region, and dynamically determine a fulfillment probability that ultimately results in the item request either being canceled or released to the supplier for preparation and delivery.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system comprising:
a network communication interface to communicate, over one or more networks, with (i) computing devices of requesting users, (ii) computing devices of menu item suppliers, and (iii) computing devices of transport providers;
one or more processors; and
a memory storing instructions that, when executed by the one or more processors, cause the computing system to:
monitor, for each respective sub-region of a service region, supply conditions corresponding to transport providers available to deliver menu items from one or more menu item suppliers to requesting users;
determine that the supply conditions for the respective sub-region have dropped below an equilibrium threshold;
in response to determining that the supply conditions have dropped below the equilibrium threshold for the respective sub-region, initiate a supply-constrained mode for the respective sub-region in which the computing system (i) inputs each respective menu item request received from a requesting user, corresponding to a delivery location within the respective sub-region, into a queue, and (ii) determines a fulfillment probability value for the respective menu item request; and
while operating in the supply-constrained mode, when the fulfillment probability of the respective menu item request exceeds a fulfillment threshold, transmit the respective menu item request to a corresponding menu item supplier for preparation of a corresponding menu item and coordinate delivery of the corresponding menu item to the requesting user.

2. The computing system of claim 1, wherein the executed instructions cause the computing system to determine the fulfillment probability of the respective menu item request by determining a probability that the requesting user will cancel the respective menu item request.

3. The computing system of claim 2, wherein the executed instructions cause the computing system to further determine the fulfillment probability of the respective menu item request by determining a probability that a transport provider will become available to deliver the corresponding menu item to the requesting user prior to the requesting user canceling the respective menu item request.

4. The computing system of claim 1, wherein the executed instructions further cause the computing system to:
when the fulfillment probability of the respective menu item request drops below a cancelation threshold, transmit a request cancelation notification to the computing device of the requesting user.

5. The computing system of claim 4, wherein the executed instructions cause the computing system to further transmit a mitigative token to the computing device of the requesting user along with the request cancelation.

6. The computing system of claim 1, wherein the executed instructions further cause the computing system to:
associate each respective menu item request in the queue with a timer; and
when the timer exceeds an expiration time without the fulfillment probability exceeding the fulfillment threshold, transmit a request cancelation notification to the computing device of the requesting user.

7. The computing system of claim 1, wherein the executed instructions further cause the computing system to:
using historical data for the given region, generate a transport supply forecast for each sub-region;
wherein the executed instructions cause the computing system to further initiate the supply-constrained mode for the respective sub-region based on the transport supply forecast for the respective sub-region.

8. A non-transitory computer-readable medium storing instructions that, when executed by one or more processors of a computing system, cause the computing system to:
communicate, over one or more networks, with (i) computing devices of requesting users, (ii) computing devices of menu item suppliers, and (iii) computing devices of transport providers;
monitor, for each respective sub-region of a service region, supply conditions corresponding to transport providers available to deliver menu items from one or more menu item suppliers to requesting users;

determine that the supply conditions for the respective sub-region have dropped below an equilibrium threshold;

in response to determining that the supply conditions have dropped below the equilibrium threshold for the respective sub-region, initiate a supply-constrained mode for the respective sub-region in which the computing system (i) inputs each respective menu item request received from a requesting user, corresponding to a delivery location within the respective sub-region, into a queue, and (ii) determines a fulfillment probability value for the respective menu item request; and while operating in the supply-constrained mode, when the fulfillment probability of the respective menu item request exceeds a fulfillment threshold, transmit the respective menu item request to a corresponding menu item supplier for preparation of a corresponding menu item and coordinate delivery of the corresponding menu item to the requesting user.

9. The non-transitory computer-readable medium of claim 8, wherein the executed instructions cause the computing system to determine the fulfillment probability of the respective menu item request by determining a probability that the requesting user will cancel the respective menu item request.

10. The non-transitory computer-readable medium of claim 9, wherein the executed instructions cause the computing system to further determine the fulfillment probability of the respective menu item request by determining a probability that a transport provider will become available to deliver the corresponding menu item to the requesting user prior to the requesting user canceling the respective menu item request.

11. The non-transitory computer-readable medium of claim 8, wherein the executed instructions further cause the computing system to:

when the fulfillment probability of the respective menu item request drops below a cancelation threshold, transmit a request cancelation notification to the computing device of the requesting user.

12. The non-transitory computer-readable medium of claim 11, wherein the executed instructions cause the computing system to further transmit a mitigative token to the computing device of the requesting user along with the request cancelation.

13. The non-transitory computer-readable medium of claim 8, wherein the executed instructions further cause the computing system to:

associate each respective menu item request in the queue with a timer; and when the timer exceeds an expiration time without the fulfillment probability exceeding the fulfillment threshold, transmit a request cancelation notification to the computing device of the requesting user.

14. The non-transitory computer-readable medium of claim 8, wherein the executed instructions further cause the computing system to:

using historical data for the given region, generate a transport supply forecast for each sub-region;

wherein the executed instructions cause the computing system to further initiate the supply-constrained mode for the respective sub-region based on the transport supply forecast for the respective sub-region.

15. A method of implementing a delivery service for a service region, the method being performed by one or more processors and comprising:

communicating, over one or more networks, with (i) computing devices of requesting users, (ii) computing devices of menu item suppliers, and (iii) computing devices of transport providers;

monitor, for each respective sub-region of a service region, supply conditions corresponding to transport providers available to deliver menu items from one or more menu item suppliers to requesting users;

determine that the supply conditions for the respective sub-region have dropped below an equilibrium threshold;

in response to determining that the supply conditions have dropped below the equilibrium threshold for the respective sub-region, initiate a supply-constrained mode for the respective sub-region in which the computing system (i) inputs each respective menu item request received from a requesting user, corresponding to a delivery location within the respective sub-region, into a queue, and (ii) determines a fulfillment probability value for the respective menu item request; and while operating in the supply-constrained mode, when the fulfillment probability of the respective menu item request exceeds a fulfillment threshold, transmit the respective menu item request to a corresponding menu item supplier for preparation of a corresponding menu item and coordinate delivery of the corresponding menu item to the requesting user.

16. The method of claim 15, wherein the one or more processors determine the fulfillment probability of the respective menu item request by determining a probability that the requesting user will cancel the respective menu item request.

17. The method of claim 16, wherein the one or more processors further determine the fulfillment probability of the respective menu item request by determining a probability that a transport provider will become available to deliver the corresponding menu item to the requesting user prior to the requesting user canceling the respective menu item request.

18. The method of claim 15, further comprising:

when the fulfillment probability of the respective menu item request drops below a cancelation threshold, transmitting a request cancelation notification to the computing device of the requesting user.

19. The method of claim 18, wherein the one or more processors further transmit a mitigative token to the computing device of the requesting user along with the request cancelation.

20. The method of claim 15, further comprising:

associating each respective menu item request in the queue with a timer; and when the timer exceeds an expiration time without the fulfillment probability exceeding the fulfillment threshold, transmitting a request cancelation notification to the computing device of the requesting user.

* * * * *